INVENTORS
HERBERT I. SCHER
ISRAEL S. UNGAR

BY Karl W. Flocks
ATTORNEY

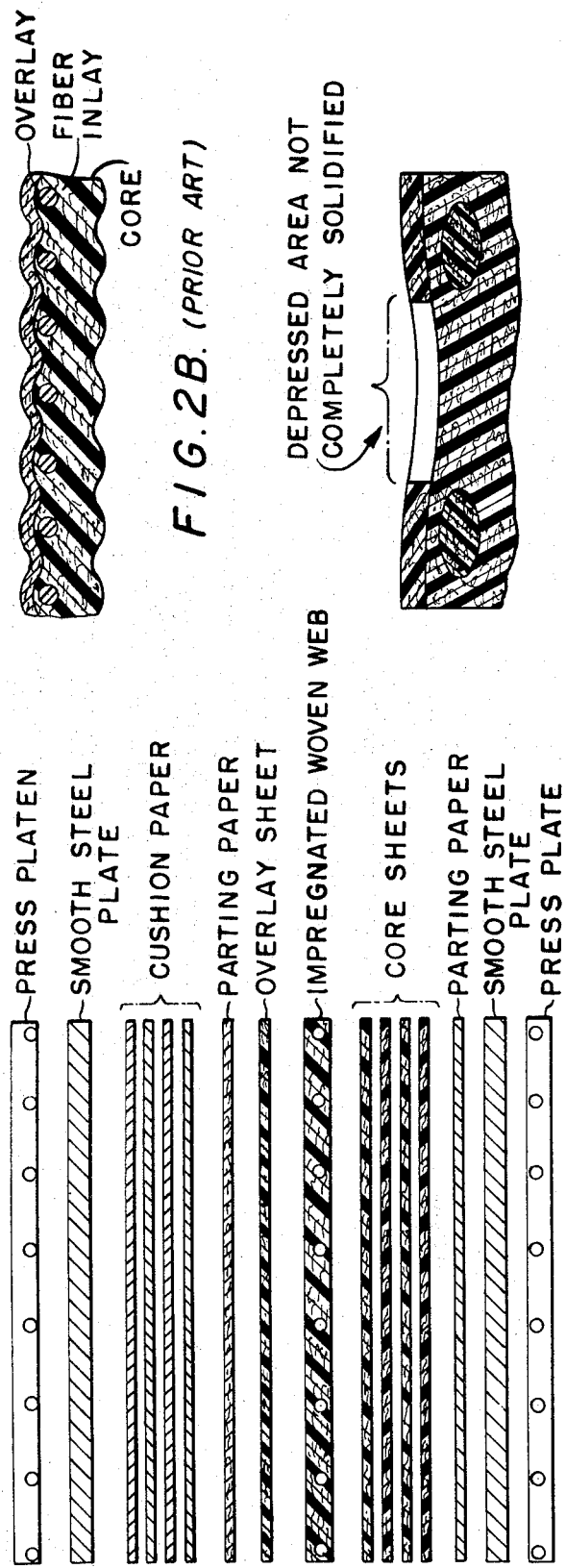

United States Patent Office 3,723,220
Patented Mar. 27, 1973

3,723,220
HIGH-PRESSURE LAMINATES WITH DEEPLY
EMBOSSED SURFACE
Herbert I. Scher and Israel S. Ungar, Randallstown, Md.,
assignors to Esso Research and Engineering Company
Continuation-in-part of application Ser. No. 94,096, Dec.
1, 1970, now Patent No. 3,700,537. This application
Aug. 9, 1971, Ser. No. 170,117
Int. Cl. B32b 3/30
U.S. Cl. 156—219
7 Claims

ABSTRACT OF THE DISCLOSURE

A high-pressure laminate with deeply embossed surface is produced using as a decorative sheet beneath the overlay, a relatively thick element of varying cross section, such as woven cane. During laminating, a silicone rubber layer is included between the overlay sheet and the upper caul plate. The resultant laminate is found to be debossed to a depth that is substantially equal to the thickness variation in the ply of varying cross sections, and may even be undercut. In addition, the depressed portions of the laminate surface are fully consolidated. The silicone rubber may be reused.

SPECIFICATION

This is a continuation-in-part of copending application Ser. No. 94,096, filed Dec. 1, 1970, now U.S. Pat. No. 3,700,537.

FIELD OF INVENTION

The present invention relates to decorative high pressure laminates and, more particularly, to such a laminate having an embossed and/or debossed surface of thickness variation greater than 7 mils in thickness, and a method of making such a laminate.

BACKGROUND OF THE INVENTION

The production of high pressure laminates is well known and has been carried out for many years. Generally such laminates are produced by consolidating, under heat and pressure, plies of paper impregnated with thermosetting condensation resins. The plies are typically consolidated and cured at 500–1600 p.s.i., preferably 800–1200 p.s.i., and 230–310° F., preferably 260–310° F., against suitable pressure plate dies, usually steel caul plates, which provide the laminate with a smooth surface. The laminates produced are durable, extremely hard and attractive and provide a permanent surfacing material known as a "high pressure laminate"; these have, for many years, found use as table tops, desk tops, counter tops, wall paneling, etc.

Most general decorative high pressure laminates, of about 1/16" thickness, are made of the following components plies, from the top down: The top sheet or overlay is normally an alpha-cellulose paper, about 29 lb. ream weight, impregnated with a water solution of melamine-formaldehyde condensate, dried and partially cured in a hot air oven. This sheet turns transparent during final press cure; its function is to protect the print sheet from abrasion or other abuse. Beneath the overlay sheet is the print sheet which is normally an alpha-cellulose paper, pigment filled, with or without decorative printing, ranging in weight from 65–125 lb. ream weight. The print sheet is also impregnated with an amino resin condensate, usually melamine-formaldehyde resin dried and partially cured as is the case with the overlay sheet. Beneath the print sheet are located a plurality, such as six, core sheets which are normally 100–130 lb. ream weight kraft paper, impregnated with a water or alcohol soluble phenol-formaldehyde condensate, dried and partially cured in a hot air oven. All of the partially cured resin condensates in the assembly are known as cured to the "B-stage" in which they are thermoplastic and will flow under heat and pressure during the laminating procedure.

The above described assembly is repeated until a "book" containing, typically, ten assemblies is obtained. The book is inserted in a high pressure press, and the laminates are cured under the conditions of heat and pressure indicated above. During the pressing cycle, the resins flow and cure, consolidating the individual plies and forming a comprehensive and infusible cross-linked product. After cure, the book is removed from the press and the laminates are separated, trimmed, and their backs or bottom surfaces sanded to improve adhesion for subsequent gluing to various substrates.

While in the early years glossy surface laminates were primarily produced between polished plates, in more recent years it has become increasingly desirable to provide various types of irregular surfaces from shallow depressioned textured and matte surfaces to relatively deeply sculptured three dimensional surfaces which simulate wood grain, leather, slate, etc. and have a surface depth as great in some cases as 7 mils. The shallow matte or textured surface laminates are normally produced in the same manner as the glossy surface laminates as indicated above, except that a texture imparting sheet is included between the upper laminate surface and smooth steel plate.

FIG. 1 is a typical assembly for pressing of a matte surfaced, general purpose, 1/16" laminate in accordance with conventional practices. In this case the parting sheet is typically a 25 lb. paper with an organic release coating. Similarly, textured surface laminates are produced by including between the impregnated overlay and the steel caul plate a parting sheet conventionally made of plain or clay coated paper bonded to a thin, about 0.3 mil, aluminum foil. During curing of the laminate, the texture of the paper in the separator sheet is imparted to the laminate surface, while the aluminum foil layer establishes the value of gloss imparted to the laminate, and also functions as a release layer, which allows the parting sheet to be stripped from the cured laminate. Textures produced in this fashion are very shallow reproductions of the paper making screen, which are seen in the parting sheet paper as density or cross sectional variations. The depth of the texture can vary depending on the grade of paper used in the parting sheet, but in general the depth is no more than about 1 mil.

Where it is desirable to produce high pressure laminates with deeply embossed surfaces that duplicate natural products such as slate, leather and wood, or non-representational effects that are functionally useful because they tend to hide the effects of physical abuse, several techniques can be used. Thus engraved metal plates can be used in place of the smooth caul plates; when made in sizes of commercial significance, these engraved plates are extremely expensive, and difficult to repair if damaged.

A more satisfactory alternative is the use of metal core plates surfaced with thermosetting resin impregnated paper, in which the surface has been molded against a replica of the desired embossed design in accordance with Michaelson et al. Pat. No. 3,311,520. These latter plates are easily and cheaply produced but the depth of the surface embossment is limited to about 7 mils; if attempts are made to produce a deeper configuration, the definition of the embossment is lost after a few pressings. In addition, the irregular distribution of pressure due to peaks greater than about 7 mils causes the plate to become dimpled during pressing unless an unreasonably thick metal core plate is used.

A third alternative is the use of embossed parting sheets: paper can be embossed with a design, and then one surface coated to a smooth, level plane. Since the sheet then has a varying cross sectional thickness, the embossed design will be imparted to the surface of the laminate during its flow period under heat and pressure. However, this process is usually limited to the production of shallow embossed designs.

In the past, some attempts have been made using woven fabrics, usually impregnated with melamine-formaldehyde condensate, in place of the impregnated paper print sheets. It has been observed that when a parting sheet is also used above the overlay, a slight cloth impression is parted to the surface of the cured laminate, corresponding in area but not thickness to the thickness variation of the cloth ply. If, in addition to the parting sheet, several sheets of soft kraft paper are included between the parting sheet and the caul plate as shown in FIG. 2A, the cured laminate surface will have a distinct embossment, in which the depth is some fraction of the thickness variation in the woven fabric as seen in FIG. 2B, which shows the cross section greatly exaggerated.

However, laminates prepared in this fashion have several undesirable characteristics: First, if the thickness variation in the woven ply is great enough to provide an interesting surface depth variation, the woven ply is crushed, and the shape of its component strands are distorted. Second, and more important, the low or depressed areas of the laminate surface are hazy, indicating poor consolidation due to lack of sufficient pressure as shown in FIG. 2C, particularly when the depth variation begins to approach 7 mils. In order to provide an adequate high pressure laminate, each portion of the laminate must be consolidated at a pressure of at least 500 p.s.i. since the melamine resin used will normally flow out and consolidate properly only at this or greater pressures. Thus, the woven fabric provides enough bridging to prevent full application of the caul pressure, be it 500 or 1600 p.s.i., to the depressed portions of the laminate, and such interposed fabric appears to reduce the pressure to below 500 p.s.i. in the depressed portions.

A third disadvantage of laminates prepared in this fashion is the tendency for a considerable portion of the thickness variation of the woven ply to be transmitted to the back of each laminate, particularly when the laminates are assembled in normal back-to-back method during consolidation in accordance with normal procedure. In fact, it is usual that a considerable portion of the thickness variation of the woven ply is produced in the back or bottom surface and this reduces the maximum depth of the embossment at the decorative surface, and requires that more than the normal amount of material must be sanded from the back of the laminate. While this tendency can be avoided to some extent by pressing the laminate against a lower caul plate instead of against the back of another laminate, this solution to the problem is accomplished only at the penalty of further reducing consolidation of the depressed portions of the design, i.e. increasing the second and most important defect discussed above, as well as increasing the cost of production.

SUMMARY OF THE INVENTION

It is, accordingly, an object of the present invention to overcome and/or diminish the defects of the prior art, such as those indicated above.

It is another object of the present invention to produce decorative high pressure laminates having deeply embossed surfaces, in a simplified and inexpensive manner.

It is another object of the present invention to provide a new and improved method for inexpensively manufacturing high pressure laminates having embossed surfaces.

It is another object of the present invention to provide a high pressure laminate with deeply embossed surfaces that can substantially exceed a 7 mil depth variation.

It is another object of the present invention to provide deep embossments in a high pressure laminate through use of an embedded ply containing the desired depth variations, in which the depressed portions of the laminate surface are subjected to enough pressure to become completely consolidated, without significantly crushing or distorting the embedded ply.

In parent application Ser. No. 94,096 there is exemplified a method in which a decorative sheet of thickness variation greater than 7 mils and preferably having openings passing therethrough, such as woven cane, is interposed in an assembly prior to limination between the print sheet and the overlay and, on top of a parting sheet there is placed a thermoplastic layer having a melting or softening temperature such that the thermoplastic is in fluid state during the laminating procedure. The invention of parent application Ser. No. 94,096 was developed after it was discovered that other types of cushioning layers were unsatisfactory: Thus, the first trial involved the use of red rubber sheeting, and although the laminate produced had the desired effect, the rubber became permanently deformed and was far too expensive for single time usage. Subsequently, the use of a thermoplastic layer was conceived and this developed into the invention of Ser. No. 94,096.

Now, in accordance with the present invention, it has been discovered that an elastomeric layer, capable of repeated reusage, may be used to produce a superior decorative high pressure laminate having thickness variation greater than 7 mils. This is accomplished by the utilization, in place of the thermoplastic layer of Ser. No. 94,096, of a silicone rubber, or equivalent rubber, sheet which must be recoverable after having been subjected to the extreme temperatures and pressures used in the high pressure laminating procedure. The preferred cushion sheet is silicone rubber of 50–70 durometer, and such sheet may be provided with a fibrous reinforcement if desired. A major advantage of the silicone rubber is that not only can it be used repeatedly, but it separates from the melamine surface without need for an additional parting sheet.

By use of the present invention there is attained, as indicated above, a superior product compared with the product produced by the exemplary procedure of Ser. No. 94,096. The cushioning effect is much greater, resulting in greater depth of embossment, negligible crushing of the pattern material, and improved physical properties in the laminate due to more uniform pressure distribution. Undercutting of the embedded pattern is possible, such as where woven cane is used as the embedment, and this results in an extremely realistic appearance. Furthermore, the cost is reduced compared with the use of the single usage thermoplastic layer.

The invention, including further objects, will be better understood by the following detailed description of an embodiment of the invention.

BRIEF DESCRIPTION OF THE DRAWINGS

FIGS. 1, 2A, 2B and 2C correspond to features of the prior art given as background material and described above;

FIG. 3B schematically shows, in cross section, a consolidated laminate in accordance with the present invention; and FIG. 3C schematically shows the effect of the cushion layer during the laminating operation.

DESCRIPTION OF THE PREFERRED EMBODIMENT

It was discovered, in accordance with the present invention, that if a laminate, in which a ply of varying cross section was incorporated, was consolidated under heat and pressure using a highly heat and pressure resistant elastomeric layer, such as silicone rubber, between the upper laminate surface and the upper caul plate, that the cured laminate surface had greatly increased depth variation and the depressed or debossed portions were fully consolidated and the back or bottom of the laminate was virtually smooth as shown in FIG. 3B. The silicone rubber in place of the thermoplastic layer of parent application 94,096, produces an improved laminate from the standpoint of better consolidation due to more uniform pressure distribution and improved visual effect due to greater depth of embossment, reduced crushing of the pattern and provision of vertical surfaces and even undercutting.

The elastomeric layer must be carefully selected to meet the requirements of the present invention. Primarily, the material must be recoverable at temperatures and pressures used in the high pressure laminating operation. Silicone rubber, with or without fibrous reinforcement, has been found to be satisfactory, although any equivalent rubber may be used. It is contemplated that certain types of polyurethane rubber and types of reinforced noeprene may also be satisfactory. If the elastomeric material is not recoverable at the temperatures and pressures used during the high pressure laminating operation, i.e., it permanently deforms, as is the case with most elastomeric materials, the economic advantages of the invention are lost.

Figure 3A:
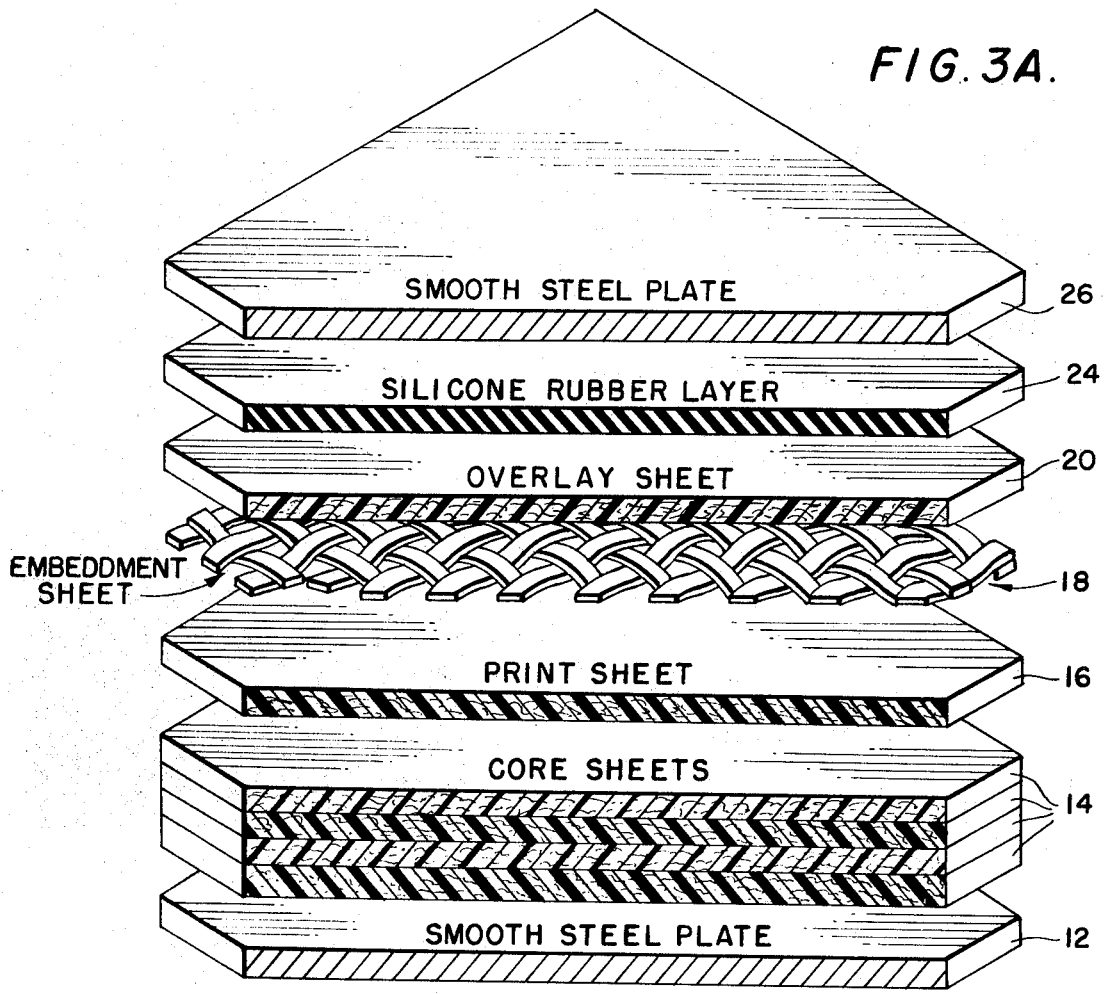
FIG. 3A schematically shows the formation of a laminate in accordance with the present invention.
Figure 1:
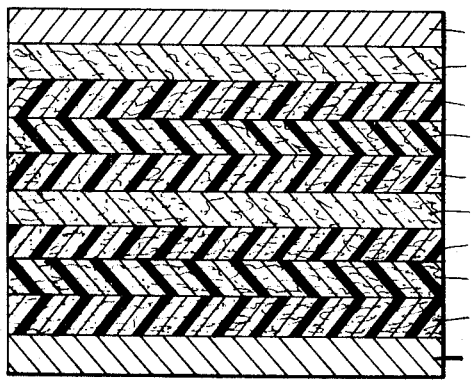

It is also important to select an elastomeric material of a proper hardness. Thus, if the material is too hard the pattern material will be crushed during the laminating procedure. On the other hand, if it is too soft, insufficient pressure will be developed during the laminating operation and the laminate will not properly consolidate. A hardness of 50–75 durometer has been found to be satisfactory. When the elastomeric layer of proper hardness is placed above the overlay sheet, as shown in FIG. 3A, and the stack is pressed, the elastomeric layer deforms and uniformly consolidates the laminate, with pressure being transmitted uniformly from the smooth plate to the irregular laminate cross section, i.e. without high pressure concentrations at the high point of the embedment and low pressure at the low points of the embedment. Evidence that the pressure is transmitted uniformly is given by the fact that the back of the cured laminate is flat and that the low points or depressions are clear and fully consolidated.

The results are surprising since, when using the previous methods such as a parting sheet with or without paper cushion, the back of the laminate contains a considerable amount of surface embossment as shown in FIG. 2B, and the low points are hazy evidencing lack of full consolidation. It was also surprising that a silicone rubber pad could be used under such extreme conditions of heat and pressure, and yet would recover its previous shape and be suitable for reuse, i.e. it was surprising that the silicone rubber would not permanently deform during the high pressure laminating operation.

The thickness of the recoverable elastomeric layer is dependent upon the thickness of the deep embossment to be provided in the laminate, although generally it should be on the order of about at least twice as thick as the thickness variation in the laminate. Thus, if a thickness variation, i.e. a debossment, is to be 7 mils deep from the highest point on the top laminate surface, the elastomeric pad should be on the order of at least about 14 mils in thickness. If the debossment is on the order of 60 mils (about 1/16") the silicone pad should be about 1/8" thick, although it may be considerably less, e.g. 90 mils thick. It will be understood, however, that it will be desirable to use a pad of standard thickness, regardless of the surface variation produced, and this pad should be sufficiently thick to provide a laminate with as great a depth as will be reasonably desired, yet not so thick that the pads become unduly expensive or take up too much room in the laminating press, thereby lowering the efficiency of the laminating operation.

In accordance with FIG. 3A, it is seen that the assembly provided to produce a laminate in accordance with the present invention comprises, from the bottom upwardly, a conventional flat molding die or steel caul plate 12, a plurality of conventional phenolic impregnated core sheets 14, a conventional melamine impregnated print sheet 16 to provide a decorative background, a suitable embedment sheet 18 which is preferably a decorative sheet of thickness variation greater than 7 mils and having openings passing therethrough, a conventional melamine resin impregnated overlay sheet 20, the recoverable elastomeric layer 24, and the upper steel caul plate 26, which is also preferably smooth.

If desired, a parting separator sheet may be utilized between the overlay sheet 20 and the recoverable elastomeric layer 24. However, it is a major advantage of the present invention that the preferred recoverable elastomeric material, silicone rubber, not only can be used repeatedly, but it separates from the melamine surface without need for an additional, and cost-increasing parting sheet. Without the use of such a parting or separator sheet, the silicone rubber directly imparts on the upper surface of the overlay sheet a natural matte surface. Such a matte surface is particularly desirable in the reproduction of certain three-dimensional surfaces.

In the event that it is desirable to provide a surface texture other than matte, a conventional parting or separating sheet may be used. However, because the thickness variation produced in the present invention is so great, exceeding 7 mils, and because the elastomeric layer transfers pressure so faithfully producing, as indicated above, vertical walls and even undercuts, there are many instances in which most conventional parting sheets are not satisfactory because they are not capable of withstanding the considerable stretch which would be imparted thereto, without tearing. Accordingly, if it is desired to produce a higher gloss on the surface of the laminate, there may be preferably used as a parting layer a soft aluminum foil of about 1 mil thickness, such soft aluminum foil being capable of stretching to the degree necessary without tearing.

It will be understood that the laminating dies or caul plates 12 and 26 are of conventional construction and, while preferably of iron or steel, may be of any suitable dimensionally stable material. The overlay sheet 20 and the print sheet 16 are also of conventional construction, preferably of alpha-cellulose paper impregnated with melamine-formaldehyde resin; the print sheet 16 is preferably impregnated with dye of suitable color, or it may be overprinted with a suitable color and/or design. The core sheets are also of conventional construction, preferably kraft paper impregnated with phenol-formaldehyde resin.

With respect to the woven embedment 18, this may be of almost any construction although it is preferably a porous sheet of decorative construction having thickness variations greater than 7 mils; while not essential, it is preferred that at least some of the thickness variation extend entirely therethrough in order to permit the print sheet 16 to provide a decorative background and to improve bonding to such print sheet. In particular open weave woven fabrics are quite desirable, such as woven cane, burlap, etc. Other plies can also be used such as lace, or a paper sheet containing holes of various shapes. The material from which the embedment 18 is formed is non-critical, although it should be a porous material such as cloth or paper, so that it can be impregnated with resin, or so that it can absorb some of the resin from the print sheet and overlay sheet during the laminating procedure, to effect a good bond. Of course, the woven embedment 17 must not be made of a material so fragile that it would be destroyed during lamination, such as by melting.

The following specific examples are offered as further illustrations of the invention:

EXAMPLE I

A pressing was made using as an embedment, a woven paper web in which each strand had been folded to a thickness of about 40 mils, and impregnated with melamine formaldehyde resin. The amount of open spaces in the weave was equal to about 30% of the surface. The silicone rubber pad used above the overlay had a thickness of 1/16". The assembly was as shown in FIG. 3A. After pressing, the silicone pad was stripped from the laminate in one piece, and both were examined. A highly satisfactory laminate resulted, having a matte finish and a depth of embossment in its surface of approximately 30-35 mils. Portions of the embossment had essentially vertical walls and the effect was extemely realistic. On the other hand, the silicone pad reverted to its flat shape and was used again repeatedly.

In comparative operations, the same laminate construction, pressed using four sheets of 128 pound kraft paper and a conventional parting sheet, in place of the silicone rubber, produced a depth variation of only about 10 mils and the web strands of the embedment were badly flattened. A procedure in accordance with Example I of parent application Ser. No. 94,096 using thermoplastic film in a parting sheet produced a laminate of essentially the same depth variation as that using the silicone rubber pad, but the surface had a higher gloss, the side walls of the debossments were not as vertical, the consolidation in the debossed areas was not quite as great, and the effect was not as realistic as in the present invention.

EXAMPLE II

The process of Example I was repeated using, as the embedment 18, a woven cane material having a thickness of about 20 mils, and impregnated with melamine formaldehyde resin. Once again, the silicone rubber pad of 1/16" thickness was used, although this time a soft aluminum foil of 1 mil thickness was used as a parting layer between the silicone rubber pad and the overlay sheet. The lamination was carried out at 1000 p.s.i. and 260-310° F., and a highly satisfactory laminate was produced just as in Example I, except that the surface finish was more glossy. As in Example I, the back of the laminate was flat and smooth and the debossed portions were extremely well consolidated. The aluminum foil parting sheet was deformed in the manner schematically illustrated in FIG. 3C, although the silicone pad (illustrated in FIG. 3C in the shape given during the pressing) reverted to its flat shape.

It will be obvious to those skilled in the art that various changes may be made without departing from the scope of the invention and the invention is not to be considered limited to what is shown in the drawings and described in the specification, but to what is claimed and the equivalent thereof.

What is claimed is:

1. A method for producing a decorative, high pressure laminate having a bottom backing of cured phenolic impregnated core sheets and an uncrushed decorative sheet of thickness variation greater than 7 mils located above said backing and wherein the top surface of said high pressure laminate is embossed and debossed to provide a surface variation in thickness greater than 7 mils and in which the debossed portions are fully consolidated, and the bottom of said laminate is relative flat, said method comprising:
   (A) assembling in a stack, from the bottom upwardly;
      a relatively flat backing die,
      a plurality of phenolic resin impregnated core sheets,
      an amino resin impregnated porous decorative sheet of thickness variation greater than 7 mils,
      a silicone rubber pad of durometer hardness of about 50-75, and
      a fronting die;
   (B) squeezing said stack assembly under about 500-1200 p.s.i. at a temperature of about 260-310° F. for a time sufficient to effect lamination and cure said resin impregnated sheets to a unitary structure; and
   (C) stripping said dies, said parting sheet and said thermoplastic layer from the resultant laminate.

2. A method in accordance with claim 1 wherein said decorative sheet has openings passing entirely therethrough.

3. A method in accordance with claim 1 wherein said silicone rubber pad has a thickness on the order of at least about twice said thickness variation.

4. A method in accordance with claim 3 wherein said pad has a thickness of about 1/16".

5. A method in accordance with claim 1 further comprising providing a stretchable parting sheet in said assembly between said overlay and said silicone pad.

6. A method in accordance with claim 2 further comprising providing an amino resin impregnated print sheet in said assembly between said core sheets and said decorative sheet.

7. A method in accordance with claim 1 further comprising providing an amino resin impregnated α-cellulose overlay sheet in said assembly between said decorative sheet and said silicone rubber pad.

References Cited
UNITED STATES PATENTS

| | | | |
|---|---|---|---|
| 3,373,068 | 3/1968 | Grosheim et al. | 156—289 |
| 3,311,520 | 3/1967 | Michaelson et al. | 156—289 |
| 3,413,188 | 11/1968 | Allen | 156—289 |
| 3,418,189 | 12/1968 | Grosheim | 161—264 |

WILLIAM A. POWELL, Primary Examiner

J. J. BELL, Assistant Examiner

U.S. Cl. X.R.

156—289, 323; 161—89, 116, 119, 263, 413